Dec. 2, 1952   M. W. BAKER ET AL   2,619,681
METHOD OF MAKING CELLULOSE BOARDS
Filed May 5, 1951   3 Sheets-Sheet 1
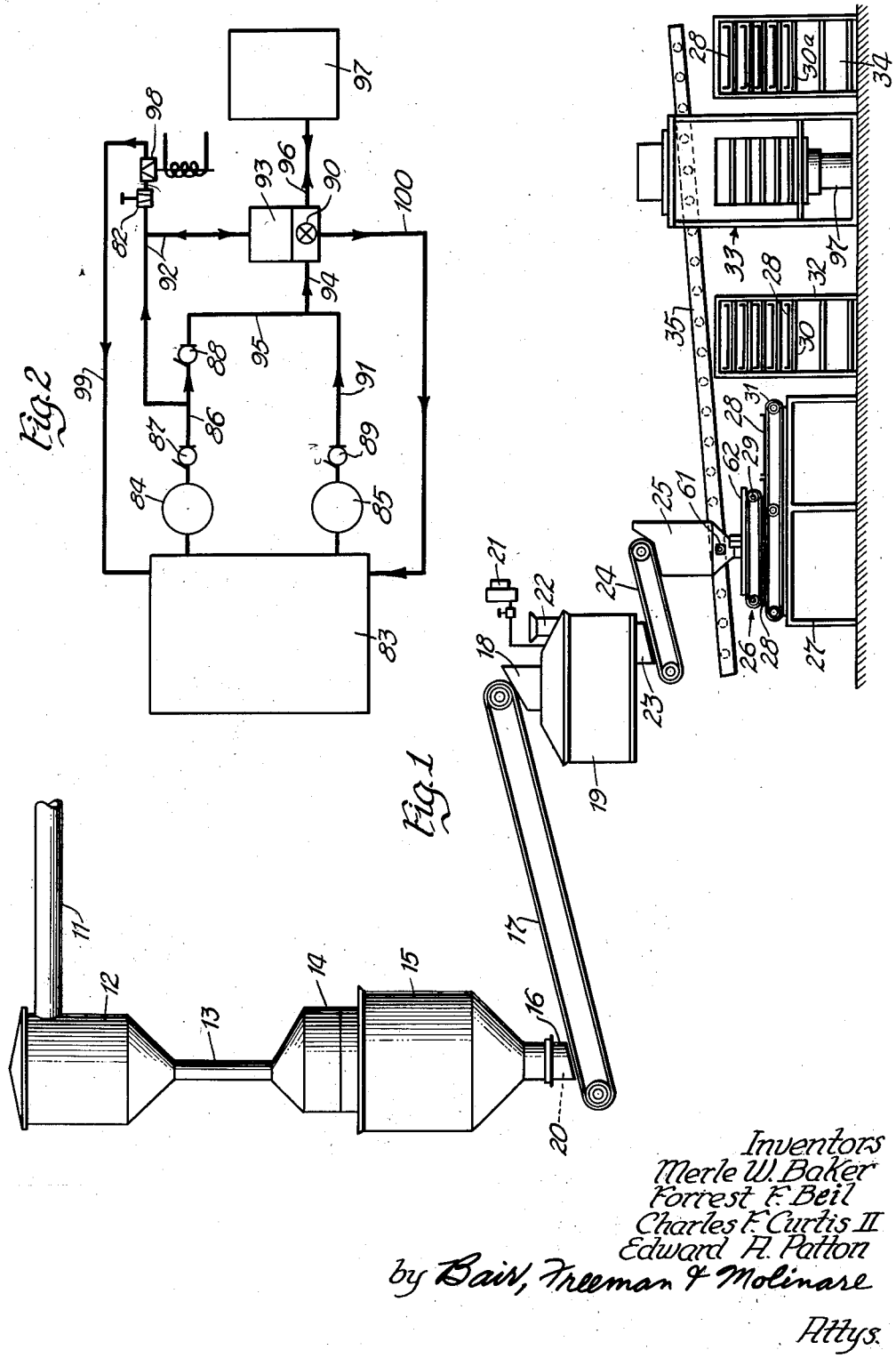
Inventors
Merle W. Baker
Forrest F. Beil
Charles F. Curtis II
Edward H. Patton
by Bair, Freeman & Molinare
Attys.

Dec. 2, 1952 M. W. BAKER ET AL 2,619,681
METHOD OF MAKING CELLULOSE BOARDS
Filed May 5, 1951 3 Sheets-Sheet 2

Inventor
Merle W. Baker
Forrest F. Beil
Charles F. Curtis II
Edward A. Patton
by Bair, Freeman & Molinare
Attys.

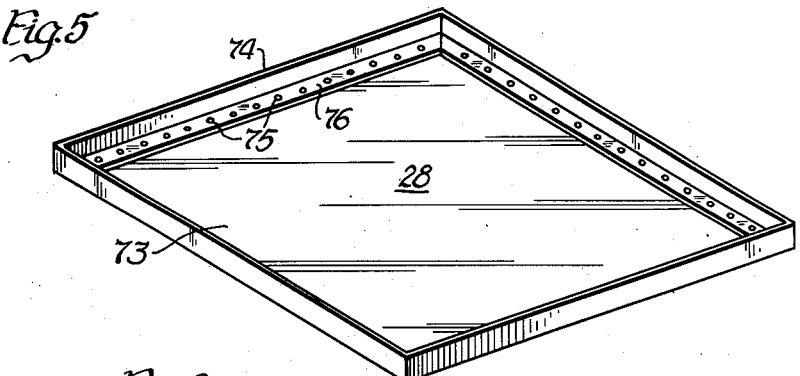
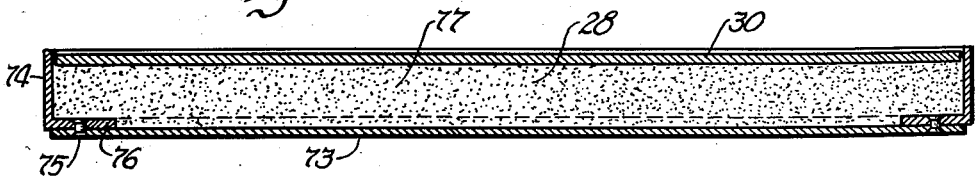
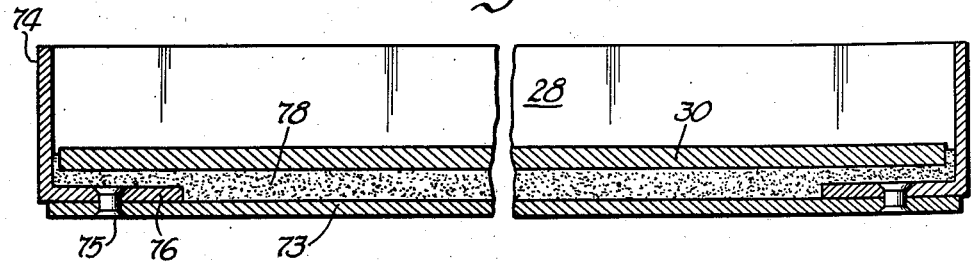

UNITED STATES PATENT OFFICE 2,619,681

METHOD OF MAKING CELLULOSE BOARDS

Merle W. Baker, Sioux City, and Forrest F. Beil, Charles F. Curtis, II, and Edward A. Patton, Clinton, Iowa, assignors to Curtis Companies, Incorporated, Clinton, Iowa, a corporation of Iowa Application May 5, 1951, Serial No. 224,804

6 Claims. (Cl. 18—47.5)

This invention relates to a method for manufacturing a compressed wood board from granulated wood such as sawdust, finely subdivided wood waste of the type obtained in mill work plants, and the like.

Reference is made to our copending application, Serial No. 28,158 now forfeited (filed May 20, 1948, entitled "Board of Compressed Cellulose Material and Method and Apparatus for Manufacturing the Same"). This application shows a method for manufacturing a compressed cellulose board characterized by high strength, freedom from warping and many other desirable characteristics. The present application is a continuation-in-part of our said copending application. Reference is also made to the copending applications of Merle W. Baker, Forrest F. Beil, Charles F. Curtis, II, and Edward A. Patton Serial No. 59,903 (filed November 13, 1948 and entitled "Apparatus for Manufacturing Boards of Compressed Cellulose Material and the Like") now U. S. Patent No. 2,583,249, Serial No. 59,902 (filed November 13, 1948 and entitled "Pan Filling Machine") and Serial No. 117,634 (filed September 24, 1949 and entitled "Pan Filling Machine"). These three applications show apparatus for practicing the methods of said first mentioned application.

The apparatus and method of the present application involve compression molding of a mixture of granulated wood and a small amount of resinous binder in relatively shallow generally flat pan or tray-like molds. More particularly, this application relates to the molding of mixtures of granulated wood with a resinous binder. These mixtures may contain as little as 4% resin and are characterized by a moisture content of at least 5%. The resinous binder is preferably, but not necessarily, thermosetting and is characterized by a capacity for flowing under the temperature and pressure conditions maintained during the molding operation for an appreciable period of time before the resin is set or cured or otherwise brought into the condition in which the binder is present in the finished board. In the molding operation the temperature of the molding mixture is raised. Thereafter a pressure of at least 150 lbs. per square inch, but less than 500 lbs. per square inch is maintained, at least initially. Further, the exact pressure employed is correlated with the moisture content of the molding mixture as disclosed in detail hereinbelow. The temperature is maintained for a sufficient time to cure or set the resin or otherwise bring the resin into the condition characteristic of the finished board. Further, the margins of the layer of mixed resin and wood being molded are compressed to from 40% to 60% of the thickness of the remaining portions of the compressed layer. Finally, the pressure is released slowly, (within a time of several seconds or minutes), rather than all at once. The compressed edges may be trimmed off to leave a panel or board of uniform thickness.

The significance of the above disclosed steps is explained as follows:

Since the margins of the layer being molded are compressed very much more than the remaining portions of the layer, the moisture content of the mixed wood and resin is maintained practically constant and uniform throughout the molding operation. In other words, the compressed margins or edges act as a seal to prevent the escape of moisture and the moisture content is kept uniform throughout the layer being molded. There is therefore, no tendency to warping or curling after the molding operation has been completed due to uneven moisture loss with consequent greater shrinkage of areas of relatively great moisture loss. Further, at a temperature of at least 280° F., a pressure of at least 150 pounds per square inch and a moisture content of at least 5%, and when the pressure has been correlated with the moisture content as described hereinbelow, the wood particles are rendered plastic and flow so as to form a board characterized by low porosity, high strength and resistance against chipping, in spite of the relatively small amounts of resinous binder present in the board. In this connection, it should be mentioned that since the resinous binder flows under the temperature and pressure conditions maintained during the initial stage of the molding operation, the resinous binder is distributed over the wood particles in a manner that utilizes more fully the binding properties of the resin. Finally, when the moisture content has been correlated with the pressure as disclosed hereinbelow, there is little or no tendency to blister when the pressure is released slowly. Pressure must be maintained at least long enough to cause both the wood particles and the resin to flow into the positions characteristic of the final board but the pressure may be reduced slowly and water vapor released, if desired, before the resin is completely cured as long as the moisture is retained for a sufficient period to plasticize the wood particles for flow into their final positions. The pressure is kept below 500 lbs. per square inch at said elevated temperature since otherwise the wood particles will be at least partly hydrolyzed or changed chemically, as evidenced by darkening, lessened ability to absorb oil stains, and other undesirable changes. Further, at pressures of 500 lbs. per square inch or higher, applied at said elevated temperature the boards tend to blister on release of pressure, even when such release is carried out slowly.

The board or sheet material prepared according to said method is characterized by high strength, cohesiveness (no tendency toward chipping or to the breaking off of small particles, particularly at edges), uniform physical characteristic (strength, rigidity, and the like) from the center of the board or sheet all the way to the edge, freedom from warping, a tendency to swell at humidities higher than normal, if at all, principally in a direction normal to the plane of the board, a hygroscopicity no higher than ordinary wood, resistance against bending, ability to take paint and other finishes in the same manner as ordinary wood and a capacity for being sawed, nailed, screwed or planed.

When the boards prepared as disclosed hereinabove are removed from the pans or molds or trays in which they have been formed, the boards are hot (about 212° F.) and have a moisture content of about 2%. After cooling, and on standing exposed to the atmosphere, the boards absorb moisture, finally reaching a moisture content that remains more or less constant. In other words, the moisture content of the boards reaches an equilibrium level which depends to some extent on the moisture content of the surrounding atmosphere. At a relative humidity of the atmosphere ranging from 60 to 70%, the moisture content of the boards becomes constant at the level ranging from 6 to 7% board moisture content.

Several days may be required for the compressed boards to reach their equilibrium with respect to moisture content. During this time the boards undergo dimensional changes, for absorption of moisture is accompanied by expansion of the boards. In other words, the boards reach a dimensional equilibrium at the same time as the board moisture content reaches an equilibrium level. As a result, the boards, immediately after cooling on removal from the pans or molds, tend to warp or to be otherwise distorted if then and there sawed into panels which at once are incorporated with a cabinet or door or like structure having sufficient rigidity to prevent free expansion or other dimensional changes in the panel made part of said structure. Of course, once the boards have reached their moisture and dimensional equilibria, the boards may be incorporated with doors, cabinets or like structures in the form of panels having any desired dimensions, and will then not warp or be otherwise distorted.

The boards in question reach their equilibria with respect to moisture content and dimensions most rapidly if individually set on edge with their broad faces exposed to the atmosphere. If stacked with their broad faces contacting, the boards require a much longer time to reach their equilibria.

It is therefore an important object of this invention to provide method and apparatus for making compressed boards from comminuted wood in which the wood particles are not changed or decomposed chemically so that the finished boards have all the physical and chemical properties to be expected in merely compressed wood particles including uniform light color and ability to absorb oil stains uniformly.

Other and further objects and features will become apparent from the following description and appended claims as illustrated by the accompanying drawings showing, diagrammatically and by way of examples, apparatus and products according to this invention. More particularly:

Figure 1 is a diagrammatic view of the apparatus utilized for effecting a complete process in the manufacture of board from granulated wood or cellulose products;

Figure 2 is a diagrammatic view of the hydraulic system used for the hot press and including a needle valve for releasing pressure slowly;

Figure 5 is a perspective view of the pan which is utilized in the pan filling machine, which pan is ultimately utilized for forming the compressed product;

Figure 6 is an enlarged sectional view of the pan with the material to be compressed therein, as it appears prior to compression, with the cover disposed on top of the material;

Figure 7 is an enlarged sectional view of the pan and cover, after the material has been compressed, with the material shown therein in the compressed condition;

Figure 8 is an enlarged sectional view of the compressed material after it has been removed from the pan; and Figure 9 is an enlarged sectional view of the material after it has been removed from the pan and the compressed ends cut off, the compressed ends being shown in dotted lines.

Figure 3:
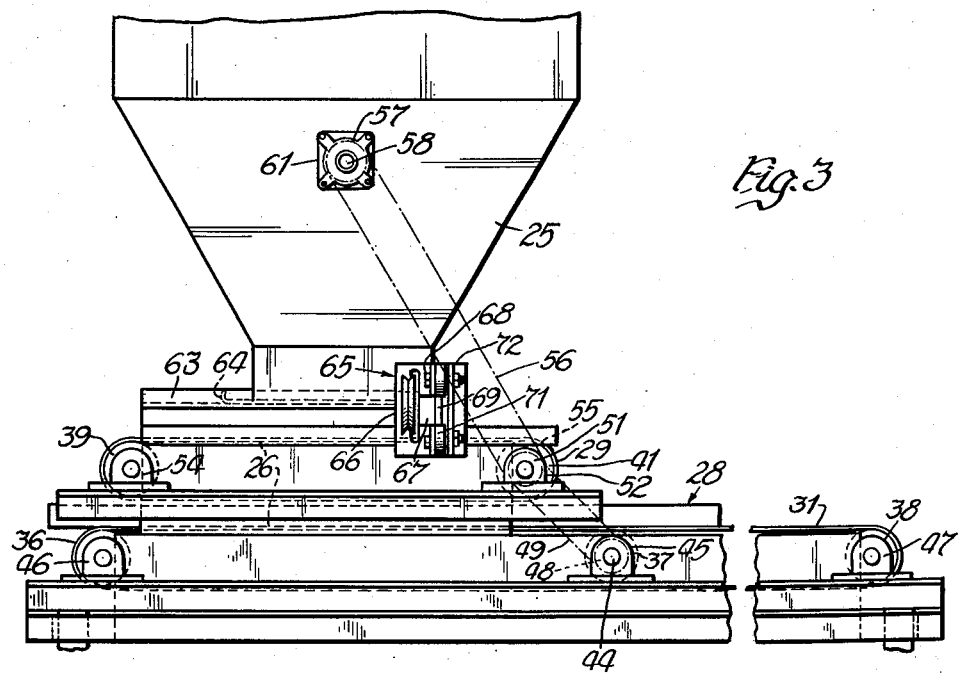
Figure 3 is a side elevation of the pan filling machine.

Referring specifically to Figure 1 for description of apparatus for practicing the present invention, numeral 11 designates a conduit which conveys, for instance, wood waste from a dust collector system in a wood working plant. The wood waste may contain a high percentage of knot sections, say, 50% knot sections and 50% machine waste.

The refuse or waste is delivered by the conduit 11 to a cyclone 12, which is preferably equipped with a magnetic separator (not shown) to remove any metal therefrom, which may cause sparks and possibly a fire. From the cyclone 12, the material is delivered through a conduit 13 to an ordinary commercial hammermill 14, which pulverizes or granulates the waste material and is equipped with a suitable screen (not shown) to deliver pulverized waste directly into a storage bin 15. This part of the process is continuous, the remainder being accomplished by a batch method. The storage bin 15 may be provided with an automatic shut-off device (not shown), which shuts off the delivery of waste through the conduit 11, when a predetermined level has been reached in the bin 15.

The pulverized material is fed through an outlet 16 from the bin 15 to a belt conveyor 17. A screw conveyor 20 is provided in the outlet conduit 16, and the belt conveyor 17 and screw conveyor 20 are synchronized electrically by any suitable means to introduce a predetermined amount of pulverized material into a waste measure 18. An automatic water valve 21 delivers a predetermined amount of water to each measured batch of pulverized material that is delivered to a muller or mixer 19. A predetermined amount of powdered or liquid resin or other binder is added to each measured batch of pulverized material. After mulling, this mixture is then dumped onto a belt conveyor 24 through an outlet conduit 23, and is delivered to a hopper 25 of the pan filling machine.

From the hopper 25, the pulverized and mixed, material is delivered to a belt system, which is generally indicated by the numeral 26. The entire pan filling machine (which may be the machine shown in said copending application Serial No. 117,634) is supported on a table 27, and the pans which are filled by the machine are shown generally at 28. A continuous belt 29, and a second continuous belt 31, are provided for conveying the pulverized mixed material to the pans, and for conveying the pans to a loading rack 32, respectively. It will be noted that the loading rack is provided with a number of shelves or supports 30 for the pans 28. From the loading rack 32, the pans are delivered either by manual or mechanical means to a hot press generally indicated at 33. The hot press itself is of modified standard design, and pressure is applied to the material in the pans, and at the same time the material is heated. When the compression step is completed, the pans with the compressed material therein are delivered to the unloading rack 34, which likewise has a number of shelves 30a for the reception of the pans 28. The pans are then removed from the rack 34, either manually or mechanically, and the compressed material is taken out of the pans by inverting them. The inverted pans 28 are then placed on a gravity roller conveyor 35, which terminates adjacent the pan loading mechanism.

Figure 4:
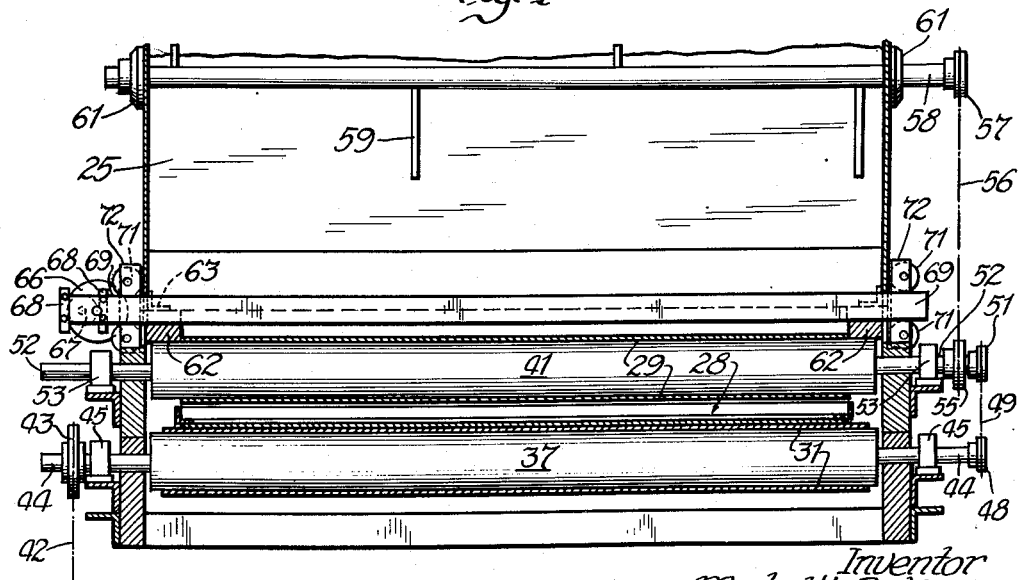
Figure 4 is a partial vertical sectional view of the machine shown in Figure 3.

Referring specifically to Figures 3 and 4 of the drawings for a detailed description of the pan filling machine, it will be noted that three rollers 36, 37 and 38 are provided for guiding and driving the lower continuous belt 31. Two rollers 39 and 41 are provided for guiding and driving the upper continuous belt 29. The roller 37 for belt 31 is driven by the chain 42, which engages a sprocket 43 connected to a shaft 44 for the roller 37. Bearings 45 are provided on each side of the machine for the shaft 44. The chain 42 is driven from any suitable source of power, such as an electric motor (not shown).

Two additional sets of bearings 46 and 47 are provided on each side of the machine for the rollers 36 and 38, respectively.

The shaft 44 for the roller 37 is provided with a sprocket 48 at one end thereof, which drives a chain 49 engageable with a sprocket 51, which is secured to a shaft 52 for the roller 41. A bearing 53 is provided at each side of the machine for the shaft 52, and a bearing 54 is provided at each side of the machine for the shaft of roller 39.

A second sprocket 55 is secured to shaft 52 and drives a chain 56, which engages with a sprocket 57 secured to a shaft 58 for driving a stirring device having stirring rods or fingers 59. The rotation of the fingers 59 maintains the mixed pulverized material in the hopper 25 in loose condition, so that it will fall by gravity onto the belt 29. Bearings 61 are provided on each side of the machine for the shaft 58 of the mixing device.

A member 62 is provided at each side of the machine adjacent the upper reach of the belt 29, in order to guide the belt, and also to prevent mixed pulverized material from spilling off the sides of the belt. Angle irons 63 are secured to the hopper 25, and a slide 64 is guided by the angle irons 63. Obviously, the slide 64 may be moved to open or close the outlet from the hopper 25 the desired amount, so that approximately the proper amount of mixed pulverized material will be delivered to the belt 29.

A doctor bar assembly is shown generally at 65, and comprises a pulley 66 adapted to be driven by a V-belt (not shown) from any suitable source of power, preferably the same electric motor which operates the other parts of the pan filling machine. A rotatable ball bearing member 67 is eccentrically connected to the pulley 66, and a pair of guide members 68 are engaged by the ball bearing member 67 to impart reciprocating motion to the doctor bar 69, to which the guide members 68 are secured. The doctor bar 69 is reciprocated between rollers 71 provided on both sides of the machine. The rollers are supported in a pair of brackets 72. The doctor bar 69 is preferably serrated.

Referring now to Figures 5 to 9, inclusive, for a detailed description of the pans 28, the pan is formed preferably, of aluminum, because of its lightness and heat conductivity. Furthermore, the aluminum is of fairly thick gauge and does not have too much tendency to warp under heat. Also, there is very little tendency for the compressed material to stick to the aluminum surface. Obviously, however, other metals may be used for the pans, such as brass or iron.

The pan 28, preferably, comprises a flat base member 73, which has an angle shaped flange 74 secured thereto by rivets 75. The horizontal portion 76 of the angle 74 overlies the base plate 73, for a purpose hereinafter described.

The mixed pulverized or granulated material is shown in Figure 6 by the numeral 77. The compressed board, as it is removed from the pan, is shown in Figures 7 and 8 by the numeral 78. When the compressed board is removed from the pan, a thin flange 79 is formed completely around the main portion of the board, because of the fact that the horizontal angle 76 of the angle piece 74 extends above the base 73. As shown in Figure 9, the thin border 79, together with a slightly upturned edge 81, which is formed between the cover 30 and the sides of the angle member 74, are removed so that a board of uniform thickness results. The portions 79 and 81, which are then removed, preferably by sawing, may then be returned to the waste or refuse material and re-pulverized.

It is obvious that separate pan covers 30 might be eliminated by having suitable pressing plates fastened to the upper surface of each hot press opening.

Referring specifically to Figure 2 of the drawings, a hydraulic system for operating the hot press 33 is there shown. The hydraulic system is conventional in its make-up, with the exception of the fact that a needle throttling valve 82 is provided for a purpose to be described.

The system comprises an oil supply tank 83, to which is connected a high pressure pump 84 and a high volume pump 85. A pipe line 86 is connected with the outlet of the high pressure pump, and has two normally closed valves 87—88 therein. A normally closed check valve 89 is provided in an outlet pipe 91 from the high volume pump 85. A pipe line 92 is connected between the valves 87 and 88 to a cylinder drain valve chamber 93. Likewise, a pipe 94 is connected to a pipe 95 extending between the valves 88 and 89 and pipe 94 is also connected to the cylinder drain valve chamber 93. A pipe 96 then connects the cylinder drain valve chamber 93 with a hydraulic piston 97, which provides the required pressure for the hot press 33.

The press 33 and the hydraulic system are provided with a standard electrical timer (not shown), which maintains a high pressure on the hydraulic piston 97 until the pressing is completed. At this time, a solenoid operated valve 98 is instantly and completely opened. The needle valve 82 is adjusted so as to provide a very small opening. The high pressure hydraulic fluid from the hydraulic piston 97 then slowly passes back through the pipe 96, through one branch of the pipe 92, through needle valve 82, solenoid operated valve 98 and back to the oil supply tank 83 through a pipe 99. A pipe 100, having a hand valve 90 therein, connects the cylinder drain valve chamber 93 with the oil supply tank 83 for the obvious purpose of draining the cylinder of the hydraulic piston 97 when desired.

Since there is considerable internal steam pressure in the panel 78 during the pressing process, the panel 78 is liable to blister or explode if the press is permitted to open instantaneously. With the needle valve 82 installed as shown, and adjusted to a very small opening, the high pressure oil is forced to pass through the small opening when the solenoid valve 98 trips or opens. Therefore, several seconds are required for the pressure to be reduced on the press 33, thus causing a gradual release of pressure in the board and eliminating blistering and possible exploding of the panel 78.

The operation of the apparatus and process has already been described up to the time that the mixed pulverized material is delivered to the hopper 25. The pan filling device preferably includes means for maintaining the granulated material in loose form. The pan filling device fills the pans 28 with a layer of granulated material of uniform thickness, regardless of any warping or twisting of the pan. After the pans have been filled with the material to be compressed, the pans are carried into the hot press 33, the covers having been placed over the pans so that they may be forced downwardly into each pan when proceeding according to the specific method illustrated in Figures 6 through 9.

Since the metal leg 76 cannot be compressed, the portion of the panel immediately above it is compressed considerably more than the remainder of the panel, producing an extremely dense edge 79, 81 around the panel, which prevents the escape of an excessive amount of steam and moisture during the pressing process. A seal results around the edge of the panel, and in addition to preventing the escape of moisture, also maintains uniform moisture distribution throughout the panel during pressing. Uniform moisture distribution brings about uniform physical characteristics in the finished panel and, in particular, minimizes internal strains in the panel, resulting in a flat panel with a minimum tendency to bow or curl due to internal strains resulting from unequal distribution of moisture during pressing.

Similar results are obtained when proceeding according to the methods illustrated in Figures 10 through 17 in said copending application Serial No. 59,903.

Another difficulty encountered in retaining the steam in the panel during the pressing operation is the tendency of the panel to explode, due to internal steam pressure, when the pressure on the hot press 33 is released. This has been overcome by installing a needle valve 82 in the hydraulic system of the hot press to permit very gradual release of pressure on the panel, as explained above.

The following materials have been found to provide a very satisfactory panel formed of compressed wood or other cellulose type material. Disintegrated wood of any species of tree may be used. Very satisfactory results have been obtained with pine wood. Preferably at least 50% of the wood is disintegrated to a 16 to 40 mesh particle size.

The resin employed is preferably one having a flow point not higher than 125° C. The resin may be a thermosetting resin capable of flowing for an appreciable period of time before it is cured or set in the press and capable of acting as a bonding agent for the wood particles. We prefer to use a resin having a curing time of from 40 to 100 seconds at 150° C. Resins of various chemical compositions share these characteristics. We can use, for instance, resins of the phenolformaldehyde type or the urea-formaldehyde type, or furfural resins and the like. Obviously, resins characterized by excessive tendency to absorb water or by insufficient resistance to weathering agents or having other undesirable characteristics should not be employed.

We have successively used, inter alia, three phenolformaldehyde resins characterized by the following bow points and cure times:

| Resin | Seconds Cure at 150° C. | Flow Point, ° C. |
| --- | --- | --- |
| A | 80–100 | 110–125 |
| B | 45 | 85–90 |
| C | 55–65 | 95–105 |

It is understood that the thermosetting resins herein referred to are capable of curing or setting under the conditions of the molding operation. In other words, the binding agents employed may or may not be resinous when initially incorporated with the granulated wood but are definitely present as resins in the finished panels. We may therefore employ binding compositions made up of resin-forming materials in any resin-forming stage short of the final or cured or set stage. The resinous binding agent may be employed in wet or dry condition. We prefer to use a solid finely pulverized resin-forming composition, since such products are most easily and most uniformly blended or mixed with the wood particles. Nevertheless, we can also employ moist or dissolved or dispersed resin-forming compositions, due regard then being had for the moisture content of the resin-forming composition when making up the mixture to be molded.

The amount of resin employed may range upwardly from 4% to 5% of the mixture being molded. We prefer to employ from 5% to 8% resin. When a dry powdered phenolformaldehyde resin is used, very satisfactory results have been obtained at a resin content of from 6% to 7%. Blistering occurs at resin contents of about 14% or higher, for such high resin contents apparently prevent the free escape of steam from the resulting dense boards when the press is opened. We prefer to keep the resin content at from 5% to 8%, to keep the cost at a minimum. Obviously, the exact amount of resin to be used will vary somewhat according to the specific nature of the particular resin being used. In general, more resin is used when the wood is more finely disintegrated.

The water content of the molding mixture is maintained at from 5% to 25%, depending on the pressure employed in the molding operation. At lower moisture contents, the panels obtained are characterized by excessive thickness, structural weakness, excessive porosity, the presence of voids in the interior of the panel and by pitted surfaces, even when relatively high pressures are used. At moisture contents in excess of 25% there is a tendency for the panels to stick or adhere to the mold walls and to the formation of blisters or even to explosive disintegration of the panel on release of the pressure, whether or not such release is accomplished slowly, if sufficient pressure has been used to form a firm panel. The correlation between the moisture content and the pressure is discussed hereinbelow. Wood waste accumulated from millwork operations commonly contains about 6 to 8% moisture. This moisture content is taken into account when the total moisture content of the pressing mixture is calculated.

It should be understood that besides the above enumerated ingredients, other materials may also be incorporated with the molding mixture. Such added material may include pigments such as titanium dioxide, iron oxides and the like, inert fillers such as chalk or barium sulfate, materials commonly used as fillers or extenders for resins, finely divided carbon and many other materials.

The above disclosed ingredients of the molding mixture are mixed with each other at a temperature below the flow point of the resin.

The pressure applied during the hot molding operation ranges from 150 to 400 pounds per square inch or higher but does not exceed 500 pounds per square inch. The pressure is correlated with the moisture content of the molding mixture according to the following table:

| Pressure in Pounds Per Square Inch | Moisture Content | | |
|---|---|---|---|
| | Broad Range | Preferred Range | Example |
| | *Percent* | *Percent* | *Percent* |
| 150 | 20–25 | 22–25 | 25 |
| 200 | 15–25 | 17–23 | 20 |
| 300 | 10–20 | 12–18 | 15 |
| 400 | 5–15 | 7–13 | 10 |
| 450 | 5–10 | 5–8 | 7 |

The correlation between the moisture content of the molding mixture and the pressure may also be tabulated as follows:

| Moisture Content in Percent | Pressure in Pounds Per Square Inch | |
|---|---|---|
| | Minimum | Maximum |
| 20–25 | 150 | 200 |
| 15–20 | 200 | 300 |
| 10–15 | 300 | 400 |
| 5–10 | 400 | 500 |

The exact pressures and moisture contents to be employed will vary, within the tabulated limits, according to a number of factors such as the thickness, strength and density required or desired in the finished panel. Obviously, these characteristics vary according to the end use of the finished panel. Further, moisture contents and pressures will vary somewhat, within the tabulated limits, according to the nature and prior preparation of the wood, the nature and amount of specific resin employed, and like factors. In making panels suitable for most, if not all purposes, on a large scale, we prefer to use a molding mixture containing from 10 to 15% moisture, and to press this mixture at from 300 to 400 pounds per square inch, using a powdered phenol-formaldehyde resin as binding agent in an amount ranging from 5 to 8%. Thus, a batch of material to be molded may have the following composition:

| | Percent by weight |
|---|---|
| Pulverized mill waste | 86.3 |
| Water | 7.7 |
| Powdered phenol-formaldehyde resin having a flow point of 110°–125° C. and a cure time of 80–100 seconds at 150° C. | 6.0 |

As explained hereinabove, the pressure is at least sufficient, at the prevailing moisture content and temperature, to cause the wood to be plasticized and at the same time not great enough to cause blistering when the pressure is released slowly.

The temperature of molding is at least 280° or 300° F. A temperature of 338° F. insures very satisfactory results with the above disclosed specific mixture. In general, the temperature must be sufficient to bring about curing or setting of any thermosetting resin employed. The time of molding should be sufficient to bring about curing or setting at the prevailing temperature. Ordinarily, from about 3½ to 10 minutes molding time is sufficient. With the above disclosed specific mixture, a molding time of 5 minutes has been found satisfactory. The full pressure should be applied at the beginning of the molding operation, to insure flow of resin before the resin is cured or set. When longer molding times and higher temperatures are employed, the resulting panel material will be more stable dimensionally under varying humidity conditions, i. e. the material is less hygroscopic.

The pressure is applied for a period of time to compress the layer of molding mixture to its final dimensions. If desired, the full pressure can be applied throughout the whole molding operation, although very good results have also been obtained by slowly reducing the pressure to a lower value as soon as complete compression has been effected.

The molds may be coated with magnesium stearate to prevent adherence. For the same purpose, the molds may be preheated, say, to 150° to 175° F. before the press mixture is introduced.

In the molding operation, the margins on the layer being compressed are compressed to about 40% to 60% of the thickness of the middle portions of the finished panel. Some warping tendency is evident if the margins are not compressed to less than 60% of the thickness of the remainder of the board. Wood cannot be compressed to less than about one-third of its original thickness. Hence, when the edges or margins have been compressed to about one-third of the thickness of the remaining portions of the panel, these margins act as stops preventing further compressing of the middle of the panel. Preferably, the margins are compressed to about 45% to 55% of the thickness of the middle portions of the panel. In the case of the above disclosed specific mixture, very satisfactory results have been obtained by compressing the margins to one-half the thickness of the remaining portions of the panel. In the case of a panel 4 ft. square, compressed margins 1" wide function very satisfactorily to seal the moisture content of the pressing mixture.

To prevent darkening, either of the whole panel (excluding the densified sealing edge or margin) or parts thereof, and to permit uniform absorption of oil stains and the like, the pressing operation is conducted so that no significant decomposition or other chemical changes are effected in the wood particles during the pressing step. For this purpose, the molding pressure is kept below 500 pounds per square inch at said elevated temperature and the full molding pressure is applied for less than 10 minutes, at least when the pressure ranges between 400 and 500 pounds per square inch. At pressures below 400 pounds per square inch, the pressure may be applied for longer periods than 10 minutes. Finally, the temperature is also kept below levels causing discoloration of the wood and reduced stain absorption. More particularly, temperatures up to about 360° F. are safe at pressures below 500 pounds per square inch applied for less than 10 minutes. At pressures less than 400 pounds per square inch, temperatures higher than 360° F. may be used, say, up to 400° F. However, as long as the flow point of the resin-forming binder is exceeded by about 80° to 100° F., no particular advantage is gained by further raising the temperature.

To show the effects of various pressures applied for various times, the following experiments are described. All these experiments were carried out in the above described apparatus, the margins of the layer of material being molded being densified as described hereinabove.

A molding mixture consisting of 93% sawdust (dry basis) and 7% water was compressed for 10 minutes at 345° F. and at a pressure of 500 pounds per square inch and yielded a board having a strength barely sufficient to hold the board together.

A second molding mixture consisting of 86% sawdust (dry basis), 7% water and 7% of a resin binder was compressed for 10 minutes at 345° F. and at a pressure of 500 pounds per square inch and yielded a blistered board of dark color.

A third molding mixture consisting of 87% sawdust (dry basis), 6% water and 7% of a resin binder was compressed for 4½ minutes at 320° F. and at a pressure of 480 pounds per square inch and yielded a board of uniformly light color devoid of blisters.

A fourth molding mixture consisting of 86% sawdust (dry basis), 7% water and 7% resin binder was compressed for 10 minutes at 345° F. and at a pressure of 480 pounds per square inch and yielded a board having a dark central portion and a light colored marginal portion. The central portion absorbed less oil stain than the lighter marginal portion.

It should be noted that the above disclosed restrictions as to pressure and time apply only to the conditions under which the present method is carried out, i. e., where the margin of the layer of granulated wood-resin mixture is densified to form a seal retaining moisture within the molding mixture inside said densified margin. In this case, the margin is densified to almost or about the limit of its compressibility, while this is not true of the material inside said margin. The latter material is not densified as much as the margin. The densified margin (which is subsequently trimmed off) is usually darkened and characterized by reduced capacity for absorbing oil stains or the like, as compared with the material within the margin. Thus, the step of compressing the margins more than the rest of the layer being molded serves not only to form a seal against the escape of moisture but the heavily densified margin material also serves as a stop preventing similar heavy compression of the material within the margin which otherwise would be darkened and have its ability to absorb oil stains reduced. In other words, the heavy densification of the marginal material permits the applications of relatively high over-all compressing forces which would cause over-all darkening and other undesirable changes in the compressed board in the absence of such marginal densification.

The edge sealing discussed in the preceding paragraph further contributes to uniformity in strength throughout the compressed boards, as illustrated by the following experiment. A number of square boards of 2 foot width were prepared using a sawdust mixture containing about 7% resin binder, as tabulated:

| Board No. | Moisture in percent | Pressure in lbs./sq. inch | Edge Seal |
| --- | --- | --- | --- |
| 1 | 14 | 300 | Yes. |
| 2 | 6 | 480 | Yes. |
| 3 | 14 | 300 | No. |
| 4 | 6 | 480 | No. |

Boards Nos. 1 and 2 were about equally strong. Both these boards showed a gradual slight increase in strength inwardly from the edge for a distance of 5 or 6 inches and were then fairly uniform in strength all the way to the center.

Boards Nos. 3 and 4 were quite weak over a marginal area 2 inches wide. At a line extending 2 inches from the edge, there was an abrupt increase in strength. From this line inwardly, the strength increased gradually to a very high value at the center of the board.

From the foregoing it will be apparent that we have provided an improved method and apparatus for forming dense board from granulated or pulverized wood or other cellulose material.

The panels or boards prepared as disclosed hereinabove are made up of wood that has not been modified chemically to a significant extent and of resin in an amount of, say, from 6 to 7%. The boards will have about the same hygroscopic characteristics (tendency to absorb water) as the wood from which the boards have been prepared. The color of the boards is approximately the same as the wood contained therein. It should be noted, in this connection, that the color of the boards is uniform and does not vary locally, as contrasted to the different colors of the sap wood and heart wood of pine and to the local color variations in plywood. The boards prepared from a pressing mixture containing from 10% to 15% moisture at from 300 to 400 pounds pressure are characterized by moduli of rupture in static bending of from 4000 to 5000 pounds per square inch in all directions. With respect to strength in static bending, these boards are one-half as strong as solid wood, one-half as strong as 3-ply plywood with surface plys running in the long direction, and twice as strong as 3-ply plywood with surface plys running cross-wise. As to impact resistance these boards compare favorably with ¼ inch pine plywood or fir wood of equal thickness or with solid wood of equal thickness, and greatly exceed many conventional building boards. For comparison with the latter, our boards are distinguished by firmer edges that will not splinter like plywood nor dent as easily as plywood or solid lumber when the edges are treated roughly. The surface of our boards resist denting many times better than pine plywood or solid lumber. Our boards shrink or swell but little. For instance, a panel of 3-foot width will swell or shrink only about 1/16 inch with a moisture change of 6%, while a pine plywood panel will swell or shrink 1/32 inch and pine lumber panel will shrink or swell 1/8 inch. Our boards are superior to plywood in resistance against warping and not as liable to damage on subjection to elevated temperatures. Our boards have surfaces excellently adapted to receive a finish, such as paint, being more absorptive so that the paint will be more firmly bonded thereto, and the paint coats do not show the hair line checks typical of painted veneers, and due to alternate transverse swelling and contraction of oriented cellulosic fibers. The initial paint coat applied to our boards yields a finish similar to painted metal. The surface of our boards accepts readily any color stain and the stain will not bring out any local color variations, as is the case with lumber or plywood. The boards may be treated to simulate natural wood grain and the staining characteristics of natural wood by the methods disclosed in said copending application Serial No. 100,004. Our boards are easily machined, with any woodworking machinery, and can consistently be produced with any desired hardness, color, size or other characteristics.

Changes in composition and procedure may be made without departing from the real spirit and purpose of our invention, and it is our intention to cover by our claims any modified forms which may be reasonably included within their scope without sacrificing any of the advantages thereof.

We claim as our invention:

1. A method of preparing a cellulosic board which comprises providing a mixture comprising mechanically disintegrated wood and a resin-forming binder in an amount ranging from about 4% to about 14% by weight of said mixture, said mixture having a moisture content ranging from about 5% to about 25%, subjecting a layer of said mixture at an elevated temperature ranging from about 280° to 400° F. to a pressure ranging from about 150 to about 500 pounds per square inch for at least 3½ but less than 10 minutes, said pressure being correlated within said range with the moisture content of said mixture as tabulated:

| Moisture Content in Percent | Pressure in Pounds Per Square Inch | |
|---|---|---|
| | Minimum | Maximum |
| 20-25 | 150 | 200 |
| 15-20 | 200 | 300 |
| 10-15 | 300 | 400 |
| 5-10 | 400 | 500 | said elevated temperature being maintained below 360° F. whenever said pressure amounts to at least 400 pounds per square inch, the margins of said layer being compressed more than the remainder of said layer to seal said remainder against moisture loss during the pressing operation, and thereafter slowly releasing said pressure to prevent blistering of the compressed board.

2. A cellulosic board prepared according to the method of claim 1.

3. A method of preparing a cellulosic board which comprises providing a mixture comprising mechanically disintegrated wood and a resin-forming binder in an amount ranging from about 4% to about 14% by weight of said mixture, said mixture having a moisture content ranging from about 10% to about 25%, subjecting a layer of said mixture at an elevated temperature ranging from about 280° to 400° F. to a pressure ranging from about 150 to about 400 pounds per square inch for at least 3½ but less than 10 minutes, said pressure being correlated within said range with the moisture content of said mixture as tabulated:

| Moisture Content in Percent | Pressure in Pounds Per Square Inch | |
|---|---|---|
| | Minimum | Maximum |
| 20-25 | 150 | 200 |
| 15-20 | 200 | 300 |
| 10-15 | 300 | 400 | the margins of said layer being compressed more than the remainder of said layer to seal said remainder against moisture loss during the pressing operation, and thereafter slowly releasing said pressure to prevent blistering of the compressed board.

4. A cellulosic board prepared according to the method of claim 3.

5. A method of preparing a cellulosic board which comprises providing a mixture comprising mechanically disintegrated wood and a resin-forming binder in an amount ranging from about 4% to about 14% by weight of said mixture, said mixture having a moisture content ranging from about 10% to about 15%, subjecting a layer of said mixture to a temperature of from about 280° to 400° F. and a pressure of about 300 to 400 pounds per square inch for a time of from at least 3½ but less than 10 minutes, the margins of said layer being compressed more than the remainder of said layer to seal said remainder against moisture loss during the pressing operation, and thereafter slowly releasing said pressure to prevent blistering of the compressed board.

6. A cellulosic board prepared according to the method of claim 5.

MERLE W. BAKER.
FORREST F. BEIL.
CHARLES F. CURTIS, II.
EDWARD A. PATTON.

REFERENCES CITED

The following references are of record in the file of this patent:

UNITED STATES PATENTS

| Number | Name | Date |
|---|---|---|
| 2,033,411 | Carson | Mar. 10, 1936 |
| 2,044,213 | Irvine | June 16, 1936 |
| 2,348,081 | Linzell | May 2, 1944 |
| 2,402,554 | Irvine et al. | June 25, 1946 |
| 2,480,851 | Goss | Sept. 6, 1949 |